July 8, 1969  W. M. ROBINSON  3,454,858
HIGH LOAD MOTOR STARTING ARRANGEMENT
Filed June 5, 1967

INVENTOR.
WILLIAM M. ROBINSON
BY
ATTORNEY

United States Patent Office 3,454,858
Patented July 8, 1969

3,454,858
HIGH LOAD MOTOR STARTING ARRANGEMENT
William M. Robinson, New Bedford, Mass., assignor to Cornell-Dubilier Electric Corporation, a corporation of Delaware
Filed June 5, 1967, Ser. No. 643,531
Int. Cl. H02p 1/44
U.S. Cl. 318—221                                    5 Claims

ABSTRACT OF THE DISCLOSURE

This invention relates to an improved arrangement for starting and running an electric motor under higher than normal load conditions. The motor normally starts and runs as a split-phase alternating current motor. Such motors have a starting winding controlled by a centrifugal switch, and a running winding. When torque is required that is greater than the torque of a split-phase motor, the overload is sensed and a capacitor of novel configuration is inserted in the motor circuit. The motor then operates as a capacitor start/run motor thereby providing appreciably more locked-rotor and accelerating torque than the same motor would have supplied connected as a split-phase motor. Importantly, the novel capacitor provides a controlled discharge of energy stored in the capacitor when, after the load has diminished, the motor returns to split-phase operation. The capacitor configuration prevents damage to the insertion device when the change in mode of operation of the motor occurs.

---

Single phase fractional-horse power motors are classified by electrical type. The most common types are split-phase, capacitor start, permanent-split capacitor, and shaded pole. Of these the most widely used are the split phase and capacitor start. Each type has certain specific advantages. A split-phase motor has two windings: a main winding and an auxiliary or start winding. The auxiliary winding provides a phase displacement that produces torque that causes initial rotation and acceleration of the rotor and connected load. When a predetermined speed, close to full speed, is attained a centrifugal mechanism within the motor operates switch contacts to disconnect the winding. The motor then accelerates to full speed with only the main winding energized. Starting torque of split-phase motors depends upon their rated power and are generally in the range of 125 to 200% of the rated load. As a result, within the industry, split-phase motors are considered either low or moderate starting-torque motors. In many respects the capacitor-start, induction-run motor is similar to the split-phase motor. The main difference is that a capacitor is inserted in series with one of the windings. The capacitor-start motor produces appreciably more locked-rotor and accelerating torque per ampere than does a comparable split-phase motor; the locked-rotor torque of a capacitor-start motor is approximately 400% of its full load torque. Capacitor-start motors are used primarily where the load-acceleration and locked-rotor torque exceed the capacity of a split-phase motor.

Refrigeration compressors and the like must frequently be started against a pressure head; therefore requiring motors having high starting torque. Split-phase motors are not widely used for driving refrigeration compressors because of their low or moderate starting torque characteristics. Of course, the amount of torque required depends, to a large measure, upon the load on the compressor itself. In many instances a split phase motor would have suitable torque characteristics once the compressor is started. However, if the compressor is "loaded" then the starting torque of a split-phase motor would be insufficient unless the motor was grossly oversized for the running load. It has been suggested that means may be provided for converting the split-phase motor to a capacitor-start motor by insertion of a capacitor in series with the winding circuit. In one mode of carrying this out the capacitor is inserted by a switching means which is a thermal current sensing relay connected in series with the motor. The relay includes a bimetal operated snap acting switch for inserting and removing the capacitor from the winding circuit. The capacitor is connected across the snap switch contacts which are normally closed. The heater element of the relay is connected in series with the motor and continuously carries all the current drawn by the motor. The temperature of the heater, and therefore the heat generated by it, is responsive to the current drawn by the motor. Under locked-rotor conditions, the split-phase motor draws current several times its normal full load current. The increased current is sensed and the snap switch operates to connect the capacitor in series with the motor winding. With the motor connected this way increased torque is now available for starting the motor.

Because of the rapid discharge of capacitors heretofore employed, difficulties have been encountered in the life of the contacts of the snap acting switch. In prior embodiments of the starting apparatus, an external resistor was placed in series with the capacitor to limit the discharge rate of the capacitor. This has been a generally unsatisfactory solution since the resistor must carry the starting current of the motor during the most adverse starting mode. In order to handle this current and to avoid reducing the current to the motor, the resistor must have low resistance but not so low as to be ineffective for the intended purpose. Further the resistor must be capable of dissipating the heat generated by the high current. This problem became acute if the motor remained in the capacitor-start configuration for any appreciable period. Additionally, when applied as a discrete component, the resistor was subject to physical damage. Failure of the resistor rendered the entire refrigeration unit inoperative.

An object of this invention is to provide a motor starting/running arrangement for a split-phase motor utilizing capacitor starting as an ancillary mode wherein the capacitor is provided with an integral mechanism providing controlled discharge rate.

It is yet another object of this invention to obviate the aforementioned difficulties by providing, in conjunction wtih the motor starter arrangement aforedescribed, a capacitance/inductance element having a controlled discharge rate.

The above and other advantages and novel features of the invention are accomplished, in the one embodiment of the invention, by the provision of a motor starting/running arrangement which includes a standard split-phase induction motor adapted for connection to a power source. The arrangement includes a thermal relay, connected in series with the motor, with a thermally responsive snap acting switch for operation in response to the current drawn by the motor through the heater. The start/run capacitor is connected across the contacts of the switch so that when the switch is operated the capacitor is inserted in the circuit. Insertion of the capacitor converts the motor to a capacitor-start mode of operation. The capacitor is short circuited by the switch contacts when the motor is operating in its split-phase mode. The novel capacitor, to which this application particularly pertains, comprises a pair of relatively long convolutely wound foils with interposed layers of dielectric. The capacitor has a pair of tabs which provide electrical connection, at discrete points, to respective ones of the foils. The tabs are positioned near opposite ends of the respective foils so that the convolutely wound foils provide an integrally inductive effect connected in series with the capacitance therebetween. This construction limits the discharge rate of the capacitor through the switch contacts when the contacts close in response to a reduction in current through the heater which signifies a reduction in the required motor torque. The controlled discharge rate of the capacitor prevents welding of the switch contacts.

The invention will be better understood from the following description taken in connection with the accompanying drawings in which.

Figure 1:
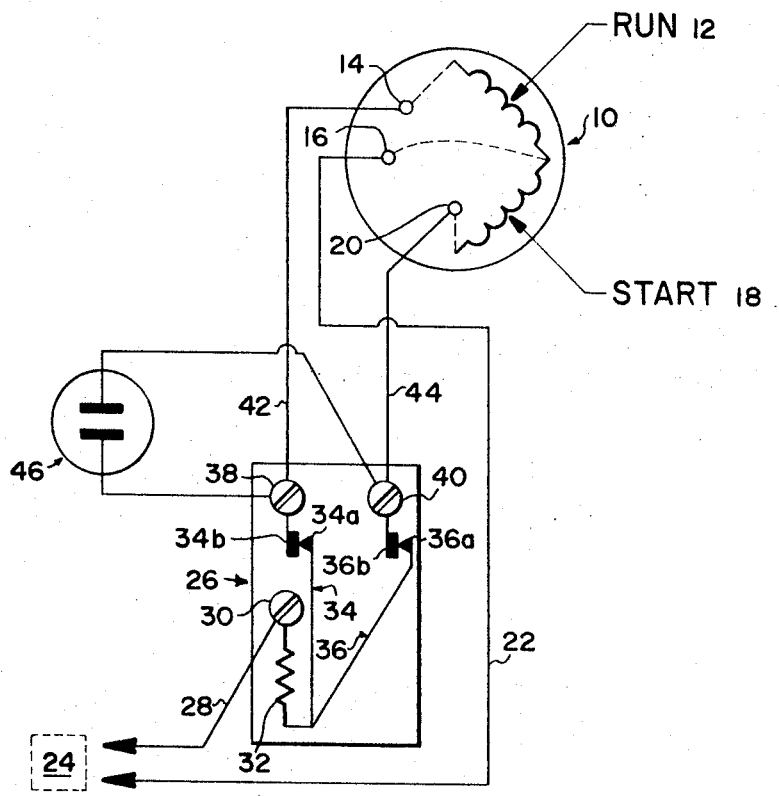
FIG. 1 is a schematic diagram of the motor control arrangement.

Referring to FIG. 1 standard split-phase induction motor 10 connected to a load such as a refrigeration compressor (not shown) is diagrammatically depicted. The motor includes run winding 12 connected between terminals 14 and 16 and start winding 18 connected between terminals 16 and 20. Although not shown, it will be understood that the motor is equipped with a centrifugally operated switch which disconnects the start winding 18 when the motor reaches a predetermined speed which is close to its operating speed. The motor terminal 16, common to both windings is connected by wire 22 the AC power source 24.

Thermal relay 26 is connected to the motor 10 by wires 42 and 44 which connect relay terminals 38 and 40 to motor terminals 14 and 20 respectively. A third relay terminal 30 is connected to power source 24 by wire 28. Terminal 30 is connected to terminals 38 and 40 by the internal mechanism of the relay. The relay mechanism includes heating resistor 32 and a pair of independentally operable thermally actuated snap acting switches 34, 36, responsive to the heat generated by current flowing through resistor 32. When motor 10 is starting or running normally the current through the resistor 32 is relatively low and both switches 34, 36 remain closed as shown in FIG. 1. At a higher level of current, above the normal split-phase induction starting current of motor 10, switch 34 is operated to thereby open contacts 34a, 34b for purposes to be described in detail below. At a still higher level of current switch 36 is operated to open contacts 36a, 36b. With switch 34 open, the opening of switch 36 acts as a safety device to prevent damage to the motor from severe overloads. Switches 34, 36 are thermally coupled to the heater 32 and both switches which are in parallel, are electrically in series with the heater 32 and the respective motor terminals 14, 20. The controlled discharge rate capacitor 46, which will be described in greater detail below, is connected between relay terminals 38 and 40 across switch 34.

The electrical circuit for normal operation is as follows: Power source 24, through wire 28 to relay terminal 30, through heater 32, through switch 34, to wire 42 to terminal 14 of run winding 12. Also through switch 36 to wire 44 to terminal 20 of start winding 18. From the run winding 12 and the start winding 18 to terminal 16 and then returning to power source 24 through wire 22. When motor 10 is loaded within its rating it starts as a split-phase induction motor; the current through heater 32 being too low to cause operation of either switch 34 or 36. Once the motor has substantially reached its designed operating speed the centrifugal switch in the motor disconnects the start winding 18. However, when the motor is heavily loaded so that it is either unable to start (locked-rotor) or it is unable to reach the speed at which the centrifugal switch disconnects the start winding, more than a normal amount of current is drawn by the motor. This increased current, which may be many times the normal full load current as when the motor is in the locked-rotor condition, passes through the heater 32. After a predetermined time interval switch 34 is operated and the contacts 34a, 34b snap open. The opening of the contacts 34a, 34b places the capacitor 46 in series with the run winding 12. The insertion of capacitor 46 changes motor 10 to the capacitor-start type by increasing the phase displacement between the start and run winding flux. The increased torque thus developed is usually sufficient to start the motor or, if it is running, to accelerate the motor and connected load to the normal operating speed at which time start winding 18 is disconnected by the motor's centrifugal switch. Once the motor has started or reached its operating speed, the torque required is decreased and the current drawn by the motor decreases. When the current has dropped to within the normal operating range of the motor, the thermally actuated switch 34 operates to close contacts 34a, 34b by passing the capacitor 46.

It is at this point that the novel capacitor configuration described below becomes particularly significant and effective. Oil-filled capacitors of the type used in starting motors must have considerable capacitance to provide the desired flux shift. Their large capacitance results in a considerable amount of energy being stored therein. A typical capacitor has a capacitance of 7.5 $\mu$f. at 165 v. 60 cycles AC. The unrestricted discharge of the energy stored in the capacitor through the closing of the switch contacts 34 will result in welding the contacts together thereby destroying the effectiveness of the relay. In order to protect the relay contacts by controlling the rate of discharge of the capacitors it has been proposed heretofore that a discharge resistor of the order of one ohm be connected in series with capacitor. It will be readily understood that such a resistor must carry all the current drawn by the motor for so long as the capacitor 46 is in the circuit. In particular the resistor must carry the motor current during the "hard start" operations. The resistor must have a low resistance value so as to not adversely affect the current available to the motor yet must have a significant resistance value so as to control the discharge rate of the capacitor. At best a compromise must be reached.

Figure 2:
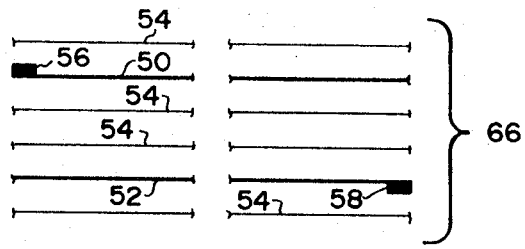
FIG. 2 is a diagrammatic representation of one embodiment of the capacitor of FIG. 1.
Figure 3:
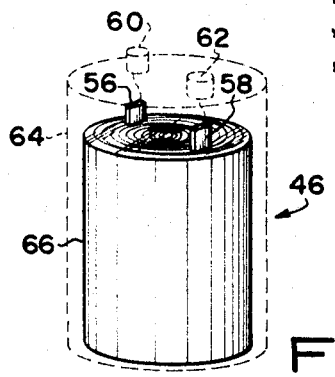
FIG. 3 is a perspective view of the capacitor of FIG. 2, the capacitor case being shown in phantom.

The necessity for the compromise external resistor is avoided by use of the novel capacitor 46. As indicated in FIGS. 2 and 3 capacitor 46 includes a pair of relatively long electrode foils 50, 52 and multiple interposed layers of dielectric 54. Conductive tabs 56 and 58 connect the foils 50, 52 to the external terminals 60, 62 carried by the sealed capacitor case 64. In the presently preferred embodiment of the invention the protruding tabs 56, 58 are placed adjacent the opposite ends of their respective foils 50, 52 during the winding operation which produces the composite wound capacitor section 66. In producing the 7.5 $\mu$f. capacitor previously mentioned, the foils are approximately 1,160 in. long and the wound section has 350 turns. With the tabs adjacent the foil ends the inductance of such a capacitor is 753 $\mu$h. resulting in a maximum discharge current of 12.5 a. through switch contacts 34a, 34b. By way of contrast, with the standard "midpoint" construction of a capacitor of similar rating heretofore available, the inductance was measured at .0257 $\mu$h. with a maximum discharge current of 125 a. The 10:1 reduction in maximum discharge current thus obtained significantly prolongs the life of the relay 26. The current-limiting resistor is no longer required and the motor receives the full value of available current during the critical "hard-start" operation.

It will be apparent to those skilled in the art that various changes and modifications may be made in the aforedescribed embodiment without departing from the spirit and scope of the invention.

What is claimed is:
1. In the combination of a normally split-phase induction motor for connection to a thermal relay said thermal relay having a heater connected in series with said motor and power source, a thermally responsive snap switch for operation by said heater in response to the current drawn by said motor through said heater, said snap switch having a normal position and an operated position, the contacts of said switch being closed in said normal position and being open in said operated position, a capacitor connected across said contacts of said switch, said capacitor being connected in series with said motor when said contacts are open and being short-circuited by said contacts when they are closed, the improvement wherein said capacitor includes a pair of long convolutely wound foils having layers of dielectric interposed therebetween, said capacitor including tabs providing electrical connection at discrete points to said foils to respective ones of said foils, said tabs being widely spaced from each other along the length of said foils, said convolutely wound foils providing an integral inductive effect connected in series with the capacitance between the foils to limit the discharge rate of said capacitor through said switch contacts when said contacts return from said operated position to said normal position in response to a reduction in current through said heater signifying a reduction in the current flowing through said motor to thereby prevent welding of said switch contacts.

2. The combination according to claim 1 wherein said capacitor connection tabs are positioned adjacent the opposite ends of said foils to maximize the inductive effect of said convolutely wound foils.

3. The combination according to claim 1 wherein said capacitor further includes a sealed case and a dielectric oil impregnant therefor.

4. The combination according to claim 1 in which said split phase induction motor is a fractional-horsepower motor, and wherein the capacitance is of the order of 7.5 $\mu f$.

5. A combination according to claim 1 wherein said split phase induction motor is a fractional-horsepower motor and said capacitor is of the order of 7.5 $\mu f$., said capacitor connection tabs being positioned adjacent to the opposite ends of said foils to maximize the inductive effect of said convolutely wound foils.

References Cited
UNITED STATES PATENTS

| | | | |
|---|---|---|---|
| 1,707,424 | 4/1929 | Bailey | 318—221 |
| 3,258,668 | 6/1966 | Milligan | 318—221 |

ORIS L. RADER, *Primary Examiner.*

G. Z. RUBINSON, *Assistant Examiner.*